(12) United States Patent
Weisbeck

(10) Patent No.: US 8,882,089 B2
(45) Date of Patent: Nov. 11, 2014

(54) DUAL RADIUS ISOLATOR

(75) Inventor: Jeffrey N. Weisbeck, East Aurora, NY (US)

(73) Assignee: ITT Manufacturing Enterprises LLC, Wilmington, DE (US)

( * ) Notice: Subject to any disclaimer, the term of this patent is extended or adjusted under 35 U.S.C. 154(b) by 141 days.

(21) Appl. No.: 13/588,589

(22) Filed: Aug. 17, 2012

(65) Prior Publication Data
US 2014/0048990 A1 Feb. 20, 2014

(51) Int. Cl.
*F16F 5/00* (2006.01)
(52) U.S. Cl.
USPC .................. 267/140.11; 267/141.2; 244/119; 244/121
(58) Field of Classification Search
USPC ..................... 267/140.11, 41, 42, 141.2, 160; 248/628, 636, 638; 244/118.2, 118.5, 244/119, 121
See application file for complete search history.

(56) References Cited

U.S. PATENT DOCUMENTS

| | | | |
|---|---|---|---|
| 2,018,180 A | 10/1935 | Lawton | |
| 3,490,556 A | 1/1970 | Bennett, Jr. et al. | |
| 4,074,491 A | 2/1978 | Bell et al. | |
| 4,091,680 A | 5/1978 | Block | |
| 4,311,213 A | 1/1982 | Desjardins et al. | |
| 4,778,321 A | 10/1988 | Okawa | |
| 4,856,765 A | 8/1989 | Kohno et al. | |
| 4,976,412 A | 12/1990 | Simon et al. | |
| 4,988,080 A | 1/1991 | Shah | |
| 5,039,264 A | 8/1991 | Benn | |
| 5,062,619 A | 11/1991 | Sato | |
| 5,080,331 A | 1/1992 | de Fontenay | |
| 5,280,890 A | 1/1994 | Wydra | |
| 5,322,267 A | 6/1994 | Halais | |
| 5,358,210 A | 10/1994 | Simon et al. | |
| 5,358,305 A | 10/1994 | Kaneko et al. | |
| 5,368,358 A | 11/1994 | Christensen | |
| 5,543,609 A | 8/1996 | Giordano et al. | |
| 5,649,812 A | 7/1997 | Schoenmeyr et al. | |
| 5,687,948 A | 11/1997 | Whiteford et al. | |
| 5,746,773 A | 5/1998 | Littig | |
| 5,810,319 A | 9/1998 | von Flotow et al. | |
| 5,876,023 A | 3/1999 | Hain et al. | |
| 5,876,024 A | 3/1999 | Hain | |
| 5,879,237 A | 3/1999 | Ishihara | |
| 5,884,736 A | 3/1999 | Burdisso et al. | |
| 5,927,699 A | 7/1999 | Nakajima et al. | |
| 5,934,019 A | 8/1999 | Rotharmel et al. | |
| 6,050,557 A | 4/2000 | Shimoseki | |
| 6,068,251 A | 5/2000 | Baumann et al. | |
| 6,158,690 A | 12/2000 | Wadey et al. | |

(Continued)

OTHER PUBLICATIONS

Abstract of Thermally Conductive and Damping Apparatus; IP.com Prior Art Database Disclosure; dated Feb. 10, 2011; 1 page.

(Continued)

*Primary Examiner* — Pamela Rodriguez
(74) *Attorney, Agent, or Firm* — Hiscock & Barclay, LLP

(57) ABSTRACT

A vibration isolator includes a base plate having a first attachment feature that enables attachment of the isolator to a first surface, the isolator further including a second attachment feature permitting attachment to a second surface. A spring section disposed between the base plate and the second attachment feature has a first radiused section and a second radiused section, each of the first and second radiused sections being formed in opposing directions on a continuous spring portion intermediate to the base plate and second attachment feature and in which the spring section provides noise attenuation and isolation between the first and second surfaces.

21 Claims, 4 Drawing Sheets

(56) References Cited

U.S. PATENT DOCUMENTS

| | | |
|---|---|---|
| 6,193,225 B1 | 2/2001 | Watanabe |
| 6,253,635 B1 | 7/2001 | Huber |
| 6,298,795 B1 | 10/2001 | Suer |
| 6,354,578 B1 | 3/2002 | Nakatsukasa et al. |
| 6,481,701 B2 | 11/2002 | Kessen et al. |
| 6,609,592 B2 | 8/2003 | Wilson |
| 6,695,296 B1 | 2/2004 | Runge |
| 6,719,503 B1 | 4/2004 | McCalmont et al. |
| 6,752,458 B1 | 6/2004 | Rivera |
| 7,017,858 B2 | 3/2006 | Roson et al. |
| 7,131,640 B2 | 11/2006 | Knowles et al. |
| 7,175,232 B2 | 2/2007 | Rivera |
| 7,387,002 B2 | 6/2008 | Clark et al. |
| 7,398,964 B2 | 7/2008 | Knowles et al. |
| 7,419,031 B2 | 9/2008 | Liguore et al. |
| 7,451,966 B1 | 11/2008 | Knowles et al. |
| 7,568,565 B2 | 8/2009 | McFarland et al. |
| 7,647,744 B2 | 1/2010 | Payne, Jr. |
| 7,694,540 B2 | 4/2010 | Ishida et al. |
| 7,726,636 B2 | 6/2010 | Miller |
| 8,042,768 B2 | 10/2011 | Liguore et al. |
| 8,079,443 B2 | 12/2011 | Keller |
| 8,128,076 B2 | 3/2012 | Sanetick et al. |
| 2005/0189687 A1 | 9/2005 | Knowles et al. |
| 2006/0061024 A1 | 3/2006 | Jung et al. |
| 2008/0230970 A1 | 9/2008 | Knowles et al. |
| 2011/0148018 A1 | 6/2011 | DeFranks et al. |
| 2012/0112396 A1 | 5/2012 | DeFranks et al. |

OTHER PUBLICATIONS

Abstract of Suppression of Aeroelastic Instabilities Through Passive Targeted Energy Transfer; Book Title: Nonlinear Targeted Energy Transfer in Mechanical and Structural Systems; Authors: Vakakis, A.F.; Gendelman, O.V.; Bergman, L.A.; McFarland, D.M.; Kerschen, G. and Lee, Y.S.; vol. 156; Copyright: 2009; 1 page.

Abstract of Developments in Structural-Acoustic Optimization for Passive Noise Control; Journal Name: Archives of Computational Methods in Engineering; Author: Steffen Marburg; vol. 9; Issue: 4; Cover Date: Dec. 1, 2002; 1 page.

DUAL RADIUS ISOLATOR

TECHNICAL FIELD

This application generally relates to the field of noise and vibration isolation and more specifically to a vibratory isolator for use in numerous structural applications, such as within the cabin of an aircraft for attenuation of noise and vibration.

BACKGROUND

It is necessary to be able to isolate vibratory and noise effects occurring between various structural components, for example in aircraft applications such as between the aircraft frame and trim panel within the interior of an aircraft fuselage. To that end, a number of current isolators that have been developed for use are typically elastomeric, such as those manufactured by Lord Corporation and Barry Controls. Other isolator versions, such as those developed by the Boeing Company, include a metallic isolator consisting of separate Belleville washers that are placed in back to back relation.

In order to be effective, trim panel isolators require low damping, as well as a soft spring element. To that end, there is a general need in the field to improve the overall manufacturability and effectiveness of these components.

SUMMARY

According to one aspect, there is provided a vibration isolator comprising a base plate having a first attachment feature configured to enable said isolator to be secured to a first surface, said isolator further including a second attachment feature that is configured for securing said isolator to a second surface. A spring section interconnects the first and second attachment features and includes a pair of spring legs and a planar section that supports the second attachment feature, each of the spring legs having a first radiused section and a second radiused section oppositely disposed on opposing ends of an interconnecting axial section.

In one version, the first attachment feature includes at least one mounting hole provided on the base plate of the isolator, and the second attachment feature is a post supported by the planar section of the spring section that supports a fastener and in another includes at least one mounting hole provided on the planar section. According to one version, the entire isolator is formed from a unitary component, such as metal, plastic, corrosion resistant steel, carbon fiber or other suitable material.

At least one elastomeric pad can also be optionally provided between at least one of the base plate and spring section and the second attachment feature and the spring section. Effectively, the herein described isolator decouples the first surface, such as an aircraft frame, from a second surface, such as a trim panel, thereby resulting in noise attenuation.

According to another version, there is provided a vibration isolator for an aircraft, said isolator comprising a base plate having a first attachment feature adapted for attaching said isolator to an aircraft frame, the assembly further comprising a second attachment feature for attaching said isolator to a trim panel of the aircraft, said isolator being disposed between the frame and said trim panel, and a spring section disposed between the base plate and said second attachment feature, the spring section including a first radiused section and a second radiused section, each radiused section being oppositely disposed on opposing ends of a continuous section intermediate to said first and second attachment features and wherein the second attachment feature is supported by a planar surface formed at one end of the spring section.

According to at least one version, the isolator is made from a unitary component, each of the base plate, second attachment feature and spring section being integral thereto and in which the isolator is further manufactured from a single material such as metal, plastic, corrosion resistant steel, carbon fiber or other suitable material.

In one version, the second attachment feature comprises a post that includes a center opening that is sized to receive a fastener securing the isolator to the trim panel. According to another version, the second attachment feature includes at least one mounting hole formed in the planar surface of the spring section.

At least one elastomeric pad can be optionally disposed between one of the base plate and the second attachment feature and the spring section of the isolator.

In one version, the spring section of the isolator includes at least one axial portion spanning the first and second radiused sections, the axial portion being substantially parallel to the planar surface and the base plate.

According to yet another version, there is provided a method for manufacturing vibratory isolator, the method comprising the steps of: providing a base plate having a first attachment feature capable of securing said isolator to a first surface; providing a second attachment feature capable of securing said isolator to a second surface; and providing a spring section intermediate to said first and second attachment features, said spring section including a first radiused section and a second radiused section relative to a spanning axial portion and a planar portion that supports the second attachment feature.

According to one version, each of the base plate, second attachment feature and spring section can be integrally formed as an unitary component. To that end, the entire isolator can be made from a single material such as metal, plastic, corrosion resistant steel, aluminum or carbon fibers, among others.

At least one elastomeric element can be provide between at least one of the base plate and the spring section and between the second attachment feature and the spring section to vary the spring rate and damping characteristics of the isolator.

In at least one version, the spring section includes a pair of spaced spring legs, the spring legs including the first and second radiused sections and the axial interconnecting portion. Preferably, each of the base plate, the planar section and the axial portions are substantially parallel to one another.

Advantageously and using the herein described isolator, vibratory forces can be effectively isolated and noise effects substantially eliminated or reduced.

The isolator, being preferably made as a unitary component, permits easy assembly to respective components. Moreover, the herein described isolator is also easier to manufacture than earlier versions designed for this purpose.

The design of the herein described isolator further permits a soft spring rate in three orthogonal directions and is therefore highly effective in terms of vibratory isolation.

The inclusion of at least one optionally provided elastomeric pad disposed on the isolator, for example between the, vibratory component and the base thereof, further softly snubs overloading conditions.

Because the isolator main section is not elastomeric, it will provide consistent isolation over a wide temperature range. For example, the herein described isolator will not be subject to hardening at cold temperature.

These and other features and advantages will be readily apparent from the following Detailed Description, which should be read in conjunction with the accompanying drawings.

DETAILED DESCRIPTION

Figure 1:
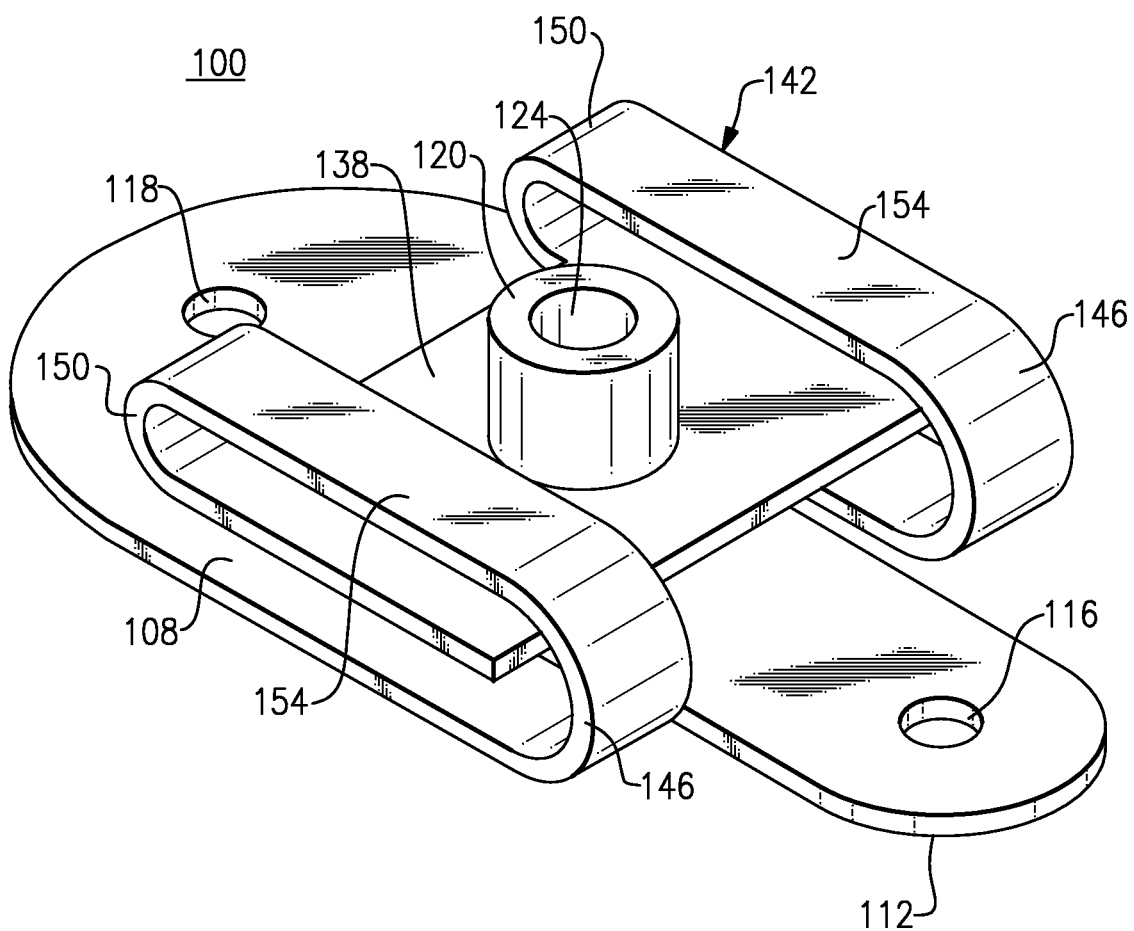
FIG. 1 is a perspective view of a dual radius vibration isolator in accordance with an exemplary embodiment.

The following relates to certain exemplary embodiments of a dual radius vibration/noise isolator as described for use in aircraft applications and more specifically for use between the frame and the trim panel within the interior of a commercial aircraft vehicle. It will be readily apparent from the discussion that follows that this isolator concept can be similarly utilized in other assemblies, such as automotive and industrial among others, and in which effective vibration and noise attenuation is needed or desired. Throughout the course of the discussion that follows, a number of terms are frequently used in order to provide a suitable frame of reference with regard to the accompanying drawings. It should be noted that these terms, which include "upper", "lower", "inner", "outer", "above", "below", "top" and "bottom", among others, are not intended to be restrictive and to overly narrow the scope of the inventive aspects, as discussed herein and further recited in the claims that directly follow this discussion, unless otherwise and as specifically noted herein to the contrary.

It should further be noted that the accompanying drawings are not necessarily presented to scale and therefore no narrowing interpretation should be made in terms of dimensions that have been depicted.

As used in this specification and the appended claims, the singular forms "a", "an" and "the" are intended to further include plural referants, unless the context clearly dictates otherwise.

The term "about" or "approximately", as used in connection with any numerical value throughout the description and the claims denotes an interval of accuracy, familiar and acceptable to a person skilled in the art. The interval governing this term is preferably ±20%.

Referring to FIGS. 1-4, there is shown a perspective view of a vibration isolator that is made in accordance with a first exemplary embodiment. According to this embodiment, the vibration isolator 100 is made as a single unitary component that is manufactured or formed from a material such as aluminum, steel, plastic, CRES (corrosion resistant steel) and/or carbon fiber, although other suitable structural materials could also be utilized. In other versions, the isolator can alternatively be constructed from separate components that are secured together to form an assemblage.

A defined planar base or base plate 108 includes a lateral tab portion 112 at one end, the tab portion including a first attachment hole or opening 116. A corresponding second opening or hole 118 is provided on an opposite side of the base plate 108 and in alignment with the first attachment hole 116 wherein the first and second attachment holes 116, 118 combine to define a first attachment feature for purposes of securing the isolator 100 to the interior of an aircraft frame (not shown). Though two attachment holes 116, 118 are provided in this exemplary embodiment, it will be readily apparent that this number can be suitably varied.

Figure 5:
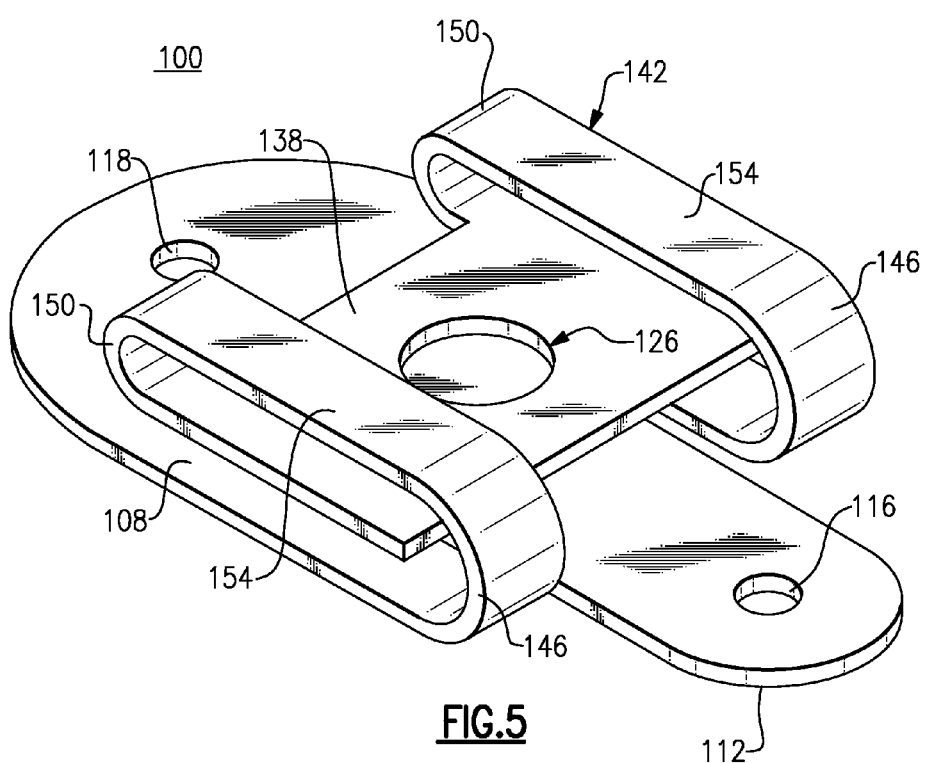
FIG. 5 is a perspective view of a dual radius vibration isolator in accordance with another exemplary embodiment.

According to this exemplary embodiment, a second attachment feature is further provided in the form of a hollow post 120 that extends upwardly from the upper surface 134 of a planar section 138 of an isolation component 128 that is disposed above and parallel to the base plate 108. According to this embodiment and due to the integrality of the isolator 100, the post 120 is integrated into the planar section 138. As previously noted, the post 120 could alternatively be supported by the planar section 138 as a separate component using means such as adhesives, heat sealing, welding and other mechanical securing means. According to this embodiment, the post 120 is defined by a substantially cylindrical configuration that includes a center opening 124 sized and configured to receive a fastener (not shown) of an aircraft trim panel (not shown). According to one version, the center opening 124 of the hollow post 120 can include internal threads (not shown) for engaging a threaded fastener (not shown). Alternatively and as shown in FIG. 5, a mounting hole 126 can be provided in the planar section 138 to serve as an attachment feature for securing the isolator to the trim panel (not shown).

Figure 2:
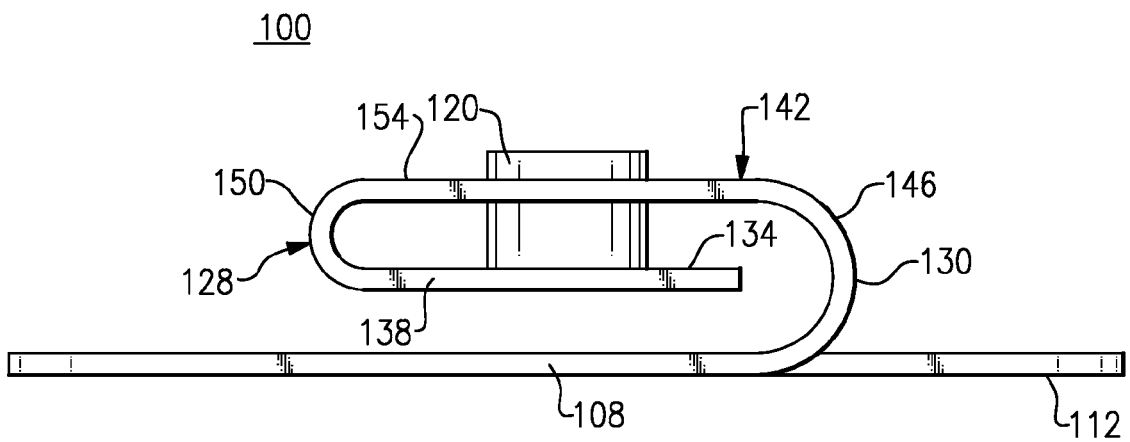
FIG. 2 is a side elevational view of the vibration isolator of FIG. 1.
Figure 3:
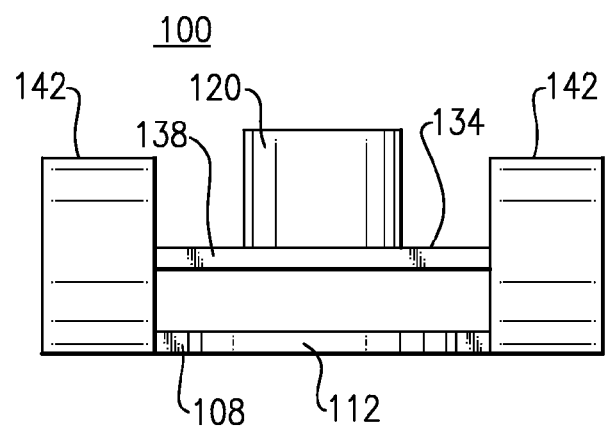
FIG. 3 is a front facing view of the vibration isolator of FIGS. 1 and 2.
Figure 4:
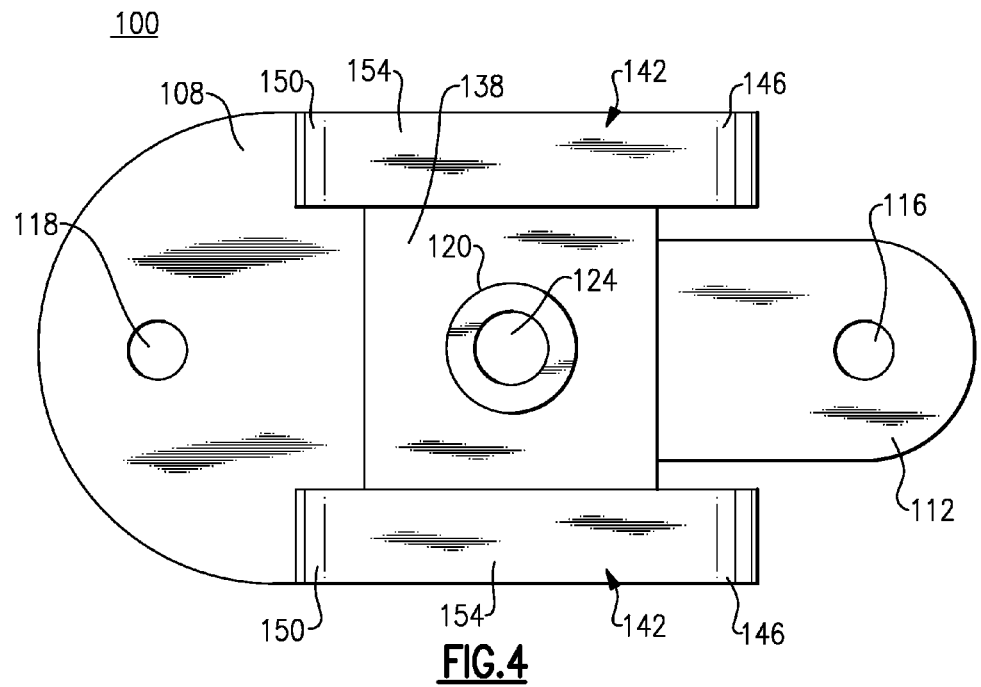
FIG. 4 is a top plan view of the vibration isolator of FIGS. 1-3.

Intermediate to the base plate 108 and the hollow post 120 is the isolator component 128, FIG. 2, which according to this exemplary embodiment is defined by a spring portion 130, FIG. 2, comprising a pair of curved spring legs 142. Each of the curved spring legs 142 are defined by a pair of radiused sections; namely, a first radiused section 146 that curls upwardly relative to the planar base 108 along a 180 degree path extending to one end of an axial section 154 and a second radiused section 150 that extends between the opposing end of the axial section 154 and curls downwardly to a lateral edge of the planar section 138 supporting the hollow post 120. Each of the axial sections 154 are parallel to one another, wherein the planar section 138 is disposed substantially intermediate to the base 108 and each axial portion 154. The planar section 138 spans substantially over the length of each axial portion 154, as well as the entire width of the base plate 108. As a result, each of the spring legs 142 of the isolator 100 form a curvi-linear configuration in which the planar section 138 is sandwiched between the base plate 108 and the top of each spring leg 142, as best seen in FIGS. 1 and 2. In this configuration and as shown most clearly in FIG. 3, the top of the post 120 extends slightly above the top of the spring legs 142.

In terms of the operation of the isolator 100 and still referring to FIGS. 1-4, the base plate 108 is mounted to the interior of the aircraft frame (not shown) while the hollow post 120 is arranged relative to a mounting hole of a trim panel (not shown) such that the isolator is disposed therebetween. As vibrational loads are imparted to the aircraft frame (not shown), the isolation component 128 and more particularly the spring legs 142 through flexion thereof store energy to provide isolation, and as a result reduce noise transmission to the interior of the aircraft cabin. Moreover and due to the substantially curvi-linear configuration of the spring legs 142, and more particularly the opposing first and second radiused sections 146, 150 and the axial sections 154, deflection can effectively be provided in three (3) orthogonal directions; that is, in a direction of the hollow post 120 as well as the planar directions of the spring legs 142.

Figure 6:
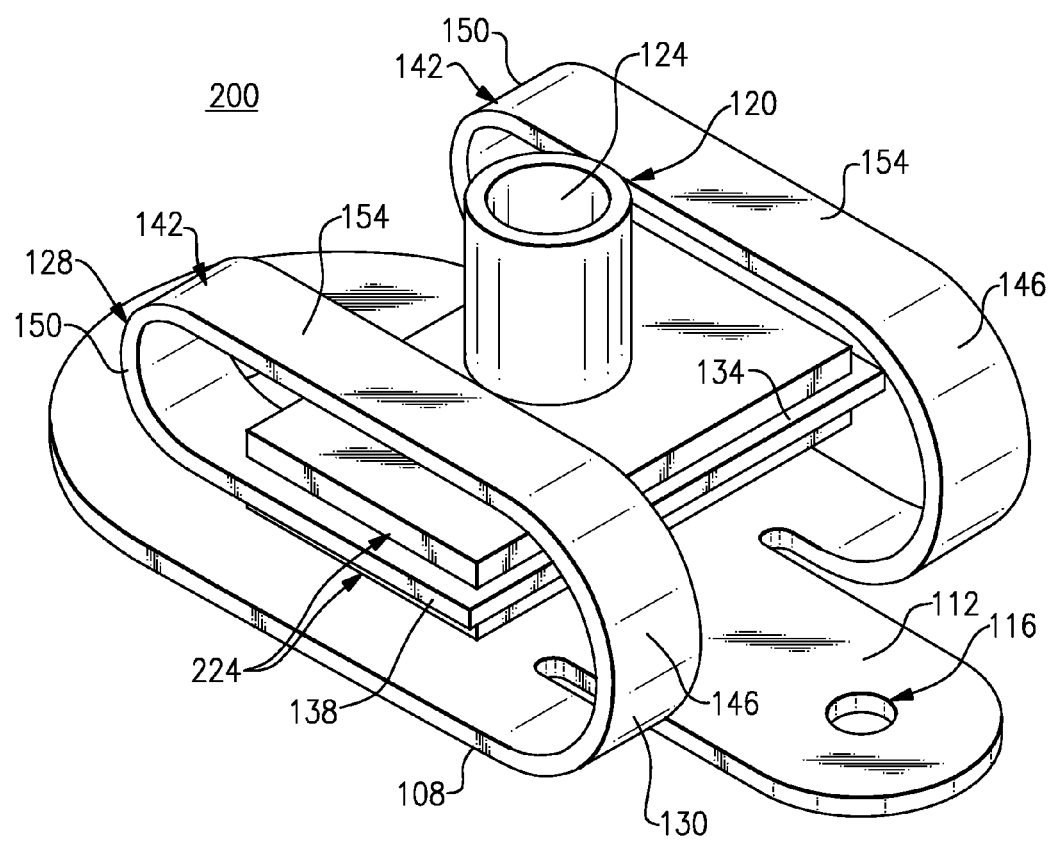
FIG. 6 is a perspective view of a vibration isolator made in accordance with yet another exemplary embodiment.

Referring to FIG. 6, there is shown an alternative embodiment of a vibration isolator 200. Similar parts are herein labeled with the same reference numerals for the sake of clarity. As in the preceding version, the vibration isolator 200 includes a planar base or base plate 108 having attachment holes 116, 118 at opposing sides that provide a first attachment feature for purposes of enabling attachment of the isolator to the interior of an aircraft frame (not shown), as well as a hollow substantially cylindrical post 120 having a center opening 124 that receives a fastener (not shown) of a trim panel of the aircraft. As previously noted, alternative attachment features can be provided in lieu of the post 120, such as a mounting hole (not shown) as previously described. An isolation component 128 disposed between the post 120 and the base plate 108 includes a pair of spring legs 142 in parallel relation, each of the spring legs further comprising opposing first and second radiused sections 146, 150 that are separated by an axial section 154 and a planar section 138, which is substantially parallel to the axial section 154 and base plate 108, the planar section having an upper surface 134 upon which the post 120 is integrally disposed. The herein described isolator 200, including each of the foregoing features according to this embodiment, is formed as a single component and a single material as previously described although separate attachment, for example, of the isolation component 128 to the base plate 108 or the post to the isolation component are suitable and alternative design constructions.

According to this exemplary embodiment, at least one elastomeric pad element 224 can be added to the isolator 200 in the event additional damping or obtaining a higher spring rate is required. As shown in FIG. 6, a pair of optional elastomeric pad elements 224 are provided in which one of the pad elements is provided in relation to the hollow post 120 and another pad element 224 is disposed between the planar section 138 and the base plate 108. The pad elements 224 can be secured based on frictional fit or using adhesives, fasteners and/or other conventional techniques.

As noted, the herein described vibration isolators 100, 200 have been described in connection with an aircraft. However, various other suitable structural applications that require low stiffness and low damping, such as those used on buses and trains, can also similarly utilize this design.

PARTS LIST FOR FIGS. 1-6

100 isolator
108 planar base or base plate
112 lateral tab portion
116 first attachment hole or opening
118 second attachment hole or opening
120 post, hollow
124 center opening
126 mounting hole
128 isolation component
130 spring portion
134 upper surface
138 planar section
142 spring legs
146 first radiused sections
150 second radiused sections
154 axial sections
200 isolator
224 elastomeric pads It will be readily apparent that various modifications and variations can be made in regard to the herein described isolator to those of sufficient skill and as recited in accordance with the following claims.

The invention claimed is:

1. A vibration isolator comprising:
    a base plate including a first attachment feature for attaching said isolator to a first surface;
    a second attachment feature for attaching said isolator to a second surface, said isolator being disposed between said first surface and said second surface; and
    a spring section interconnecting the base plate and said second attachment feature, said spring section including a pair of spring legs and a planar section that supports the second attachment feature, each of said spring legs having a first radiused section and a second radiused section disposed on opposing ends of an interconnecting axial section disposed above the planar section and in substantially parallel relation therewith and in which the first and second radiused sections of each spring leg spans about 180 degrees.

2. An isolator as recited in claim 1, wherein said isolator is a unitary component, each of said base plate, said second attachment feature and said spring section being integral thereto.

3. An isolator as recited in claim 1, wherein said isolator is formed from a single material.

4. An isolator as recited in claim 3, wherein said material is one of the group consisting of metal, plastic, and carbon fiber.

5. An isolator as recited in claim 1, wherein further including at least one elastomeric pad.

6. An isolator as recited in claim 5, wherein at least one elastomeric pad is disposed between at least one of said base plate and said spring section and said second attachment feature and said spring section.

7. An isolator as recited in claim 1, wherein said first attachment feature includes at least one mounting hole formed in said base plate.

8. An isolator as recited in claim 1, wherein said second attachment feature comprises a hollow post supported by said planar section.

9. A vibration isolator for use in an aircraft, said isolator comprising:
    a base plate including a first attachment feature adapted for attaching said isolator to an aircraft frame;
    a second attachment feature for attaching said isolator to a trim panel of the aircraft, said isolator being disposed between said frame and said trim panel; and
    a spring section disposed between the base plate and said second attachment feature, said spring section including a pair of first radiused sections and a pair of second radiused sections disposed on opposing ends of a pair of continuous axial sections intermediate to said first and second attachment features wherein said second attachment feature is supported by a planar surface formed at one end of the spring section, said planar surface being disposed between each continuous axial section and the base plate and in substantially parallel relation therewith and in which each of the first and second radiused sections span substantially 180 degrees.

10. An isolator as recited in claim 9, including at least one elastomeric pad disposed between at least one of said base plate and said spring section and said second attachment feature and said spring section.

11. An isolator as recited in claim 9, wherein said spring section includes a pair of spring legs, each of said spring legs being spaced from one another in relation to said second attachment feature and including said first and second radiused sections and a said axial section interconnecting said first and second radiused sections.

12. An isolator as recited in claim 9, wherein said isolator is formed as a unitary component, each of said base plate, said second attachment feature and said spring section being integral thereto.

13. An isolator as recited in claim 9, wherein said isolator is formed entirely from a single material.

14. An isolator as recited in claim 13, wherein said material is from one of the group consisting of metal, plastic, and carbon fiber.

15. A method for manufacturing a vibratory isolator, said method comprising the steps of:
    providing a base plate having a first attachment feature capable of securing said isolator to a first surface;
    providing a second attachment feature capable of securing said isolator to a second surface; and
    providing a spring section intermediate to said base plate and said second attachment feature, said spring section including a pair of first radiused sections and a pair of second radiused sections disposed in opposing directions relative to a pair of spanning axial portions and a planar section that supports the second attachment feature, said planar section being disposed between the base plate and the spanning axial portions of the spring section and in substantially parallel relation therewith and in which each of the first and second radiused sections span substantially 180 degrees.

16. A method as recited in claim 15, wherein each of said base plate, said second attachment feature and said spring section are integrally formed as a unitary component.

17. A method as recited in claim 15, including the additional step of providing at least one elastomeric element between at least one of between said base plate and said spring section and between said second attachment feature and said spring section.

18. A method as recited in claim 15, wherein said second attachment feature comprises a post having a center opening that enables attachment to said second surface.

19. A method as recited in claim 15, wherein said spring section includes a pair of spaced spring legs, each of said spring legs including said first and second radiused sections and said axial spanning portion.

20. A method as recited in claim 15, wherein the isolator is formed from a single material.

21. A method as recited in claim 20, wherein said material is selected from one of the group consisting of metal, plastic, and carbon fiber.

* * * * *